United States Patent [19]

Anderson

[11] 4,451,138
[45] May 29, 1984

[54] ELECTROPHOTOGRAPHIC COPYING APPARATUS HAVING AN AUTOMATIC FEED ARRANGEMENT AND AN END-OF-FEED SENSING ASSEMBLY

[75] Inventor: Carl P. Anderson, Menlo Park, Calif.
[73] Assignee: Ricoh Systems, Inc., San Jose, Calif.
[21] Appl. No.: 446,555
[22] Filed: Dec. 3, 1982
[51] Int. Cl.³ .............................................. G03G 15/00
[52] U.S. Cl. ............................ 355/14 SH; 355/3 SH; 355/24; 271/153; 271/258; 271/3.1; 271/265
[58] Field of Search ............. 355/14 SH, 3 SH, 14 R, 355/24; 271/126, 127, 153, 258, 3.1, 265

[56] References Cited
U.S. PATENT DOCUMENTS

| | | | |
|---|---|---|---|
| 3,955,811 | 5/1976 | Gibson | 271/126 X |
| 4,078,787 | 3/1978 | Burlew et al. | 271/3.1 |
| 4,132,401 | 1/1979 | Gauronski et al. | 271/265 X |
| 4,272,180 | 6/1981 | Satomi et al. | 355/14 SH X |
| 4,330,197 | 5/1982 | Smith et al. | 355/14 SH |
| 4,376,529 | 3/1983 | George et al. | 355/14 SH X |

*Primary Examiner*—A. C. Prescott
*Attorney, Agent, or Firm*—Flehr, Hohbach, Test, Albritton & Herbert

[57] ABSTRACT

An electrophotographic copying apparatus designed to make successive copies from a stack of original documents, automatically, is disclosed herein. To this end, the apparatus utilizes a feeding arrangement configured to act on the stack in a way which successively moves each document onto the copying platen from the bottom of the stack when the latter is placed in a feed tray forming part of the overall arrangement, and thereafter back onto the top of the stack within the tray along a looped path of movement from the tray to the platen and back to the tray. The copying apparatus also includes an assembly located to one side of the feed tray for detecting when the last document in the stack has moved from the tray to the copying platen.

8 Claims, 7 Drawing Figures

U.S. Patent  May 29, 1984  Sheet 1 of 2  4,451,138
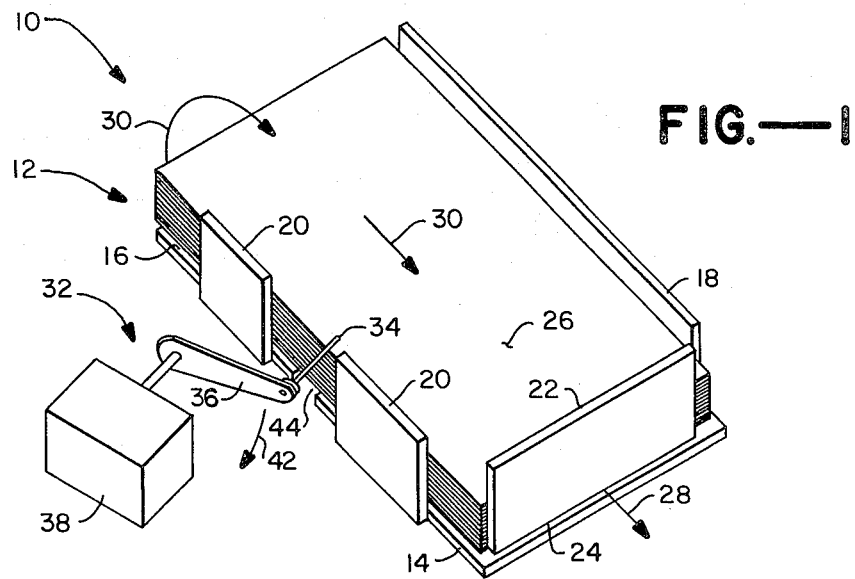
FIG.—1
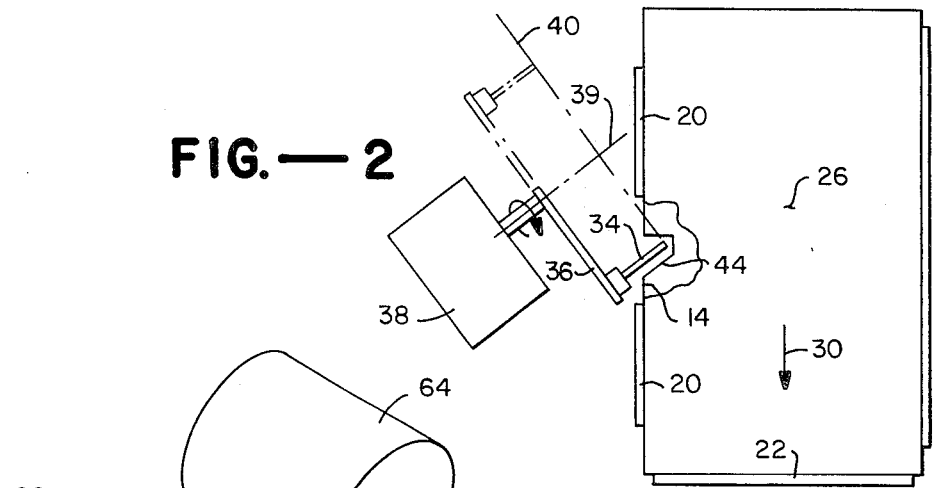
FIG.—2
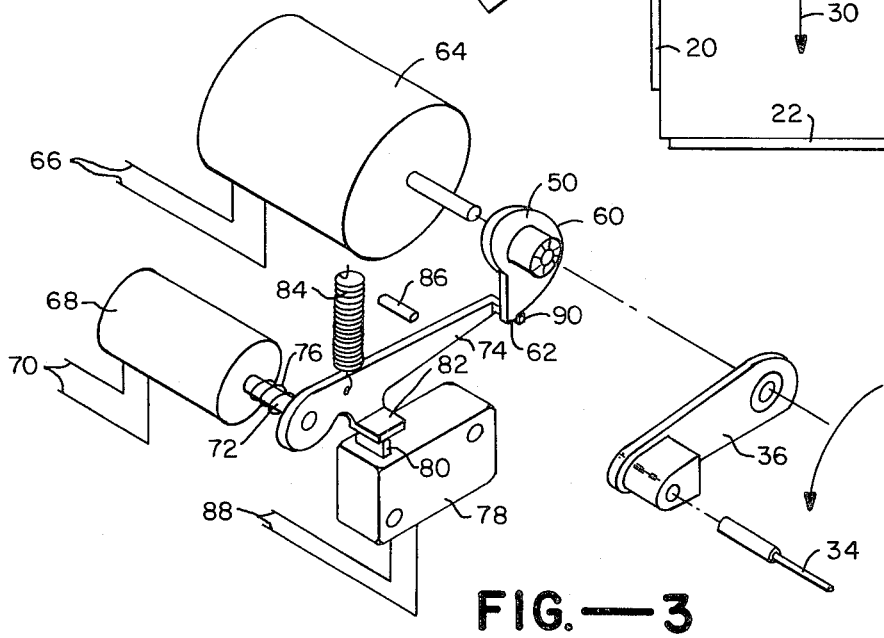
FIG.—3

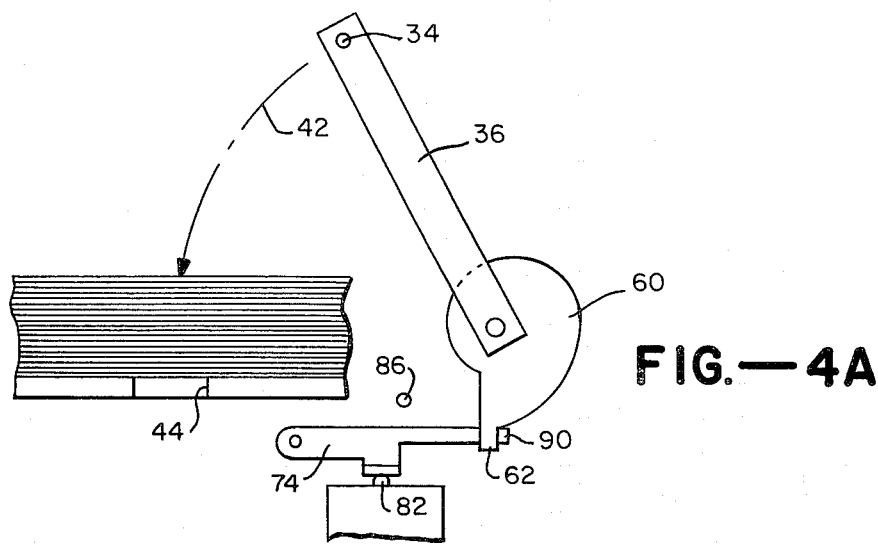
FIG.—4A
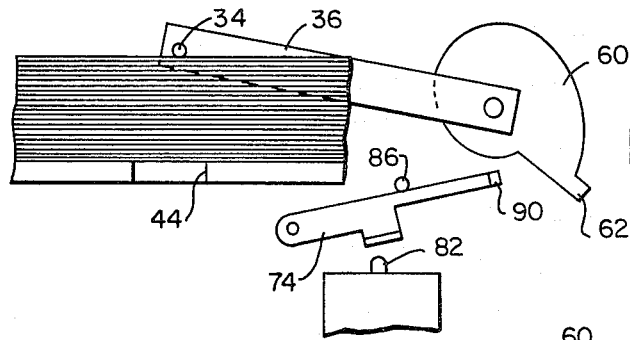
FIG.—4B
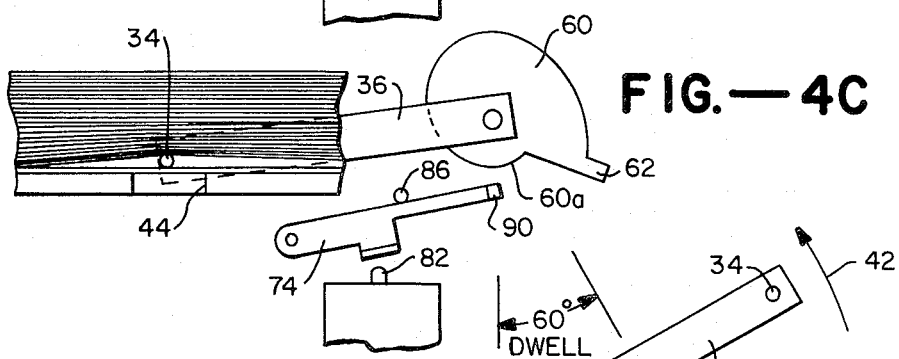
FIG.—4C
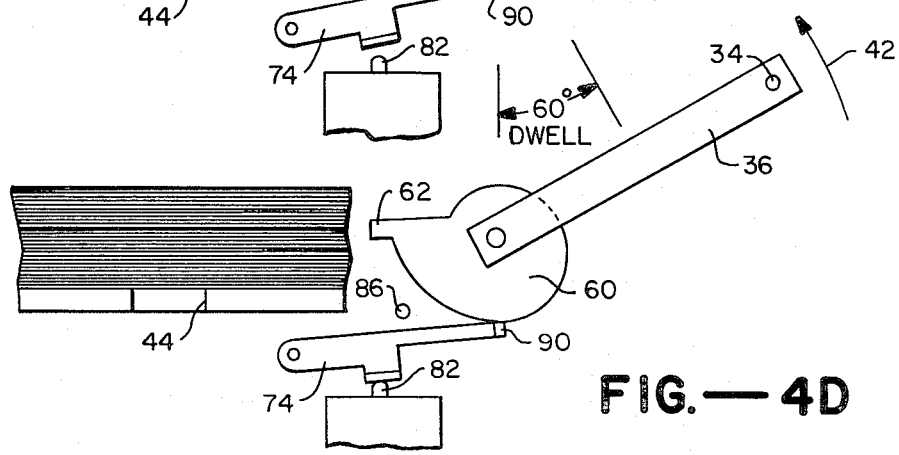
FIG.—4D

ELECTROPHOTOGRAPHIC COPYING APPARATUS HAVING AN AUTOMATIC FEED ARRANGEMENT AND AN END-OF-FEED SENSING ASSEMBLY

The present invention relates generally to electrophotographic copying apparatus and more particularly to one designed to make successive copies from a stack of original documents, automatically. This particular apparatus uses a feeding arrangement configured to act on the stack in a way which successively moves each document onto a copying platen from the bottom of the stack when the latter is placed in a feed tray and thereafter back onto the top of the stack along a looped path of movement from the tray to the platen and back to the tray.

It is quite desirable if not absolutely necessary to detect when an entire stack of documents has been copied in an apparatus of the type recited immediately above. Therefore, those types of apparatus generally include some sort of arrangement for determining when the last document within the stack has been fed from its feed tray to the copying platen. One way in which this has been done heretofore has been to provide a means including a sensing element at a position adjacent one end of the feed tray (specifically its back end). In this arrangement, the sensing element rests on the top of the stack of documents to be copied while the latter is on the feed tray, and moves down with the stack until it reaches the tray itself.

One problem with the approach just described is that the back end of the tray cannot be used as a measuring edge for original documents of different sizes. The front end of the tray must be used for this purpose along with one side. As a result, documents which are shorter than the standard 8.5"×11" size such as U.S. patents may not be sufficiently long to reach the sensing element when stacked on the tray against its front end. Another potential problem with placing the sensing element adjacent the back end of the tray relates to the specific way in which the original documents are fed. More specifically, in some feed arrangements they are fed, one at a time, from the bottom of the stack to the copying platen from the front end of the tray and thereafter back onto the top of the stack, again one at a time, from the back of the tray. Therefore, it is necessary to provide an unobstructed path of movement for the documents as they return to the tray from its back side. As a result, if a sensing element is to be placed at the back end of the tray it must be designed with this in mind.

In view of the foregoing, it is one object of the present invention to provide an end-of-feed sensing assembly for use in an electrophotographic copying apparatus of the type described above but specifically an assembly which is designed to eliminate both of the problems discussed immediately above.

Another object of the present invention is to provide an assembly of the last-mentioned type and specifically one which is uncomplicated in design and reliable in use.

Still another object of the present invention is to provide the last-mentioned assembly in a way which minimizes and preferably entirely eliminates the possibility of damage to the original documents being copied as they interact with the sensing assembly.

As discussed briefly above, and as will be seen in more detail hereinafter, the end-of-feed sensing assembly disclosed herein is designed in accordance with the present invention for use in an electrophotographic apparatus designed to make successive copies from a stack of original documents, automatically, by using a specific feeding arrangement. This arrangement is configured to act on the stack in a way which successively moves each document onto a copying platen from the bottom of the stack when the latter is placed in a feed tray forming part of the arrangement and thereafter back onto the top of the stack along a looped path of movement from the tray to the platen and back to the tray.

The end-of-feed sensing assembly disclosed herein specifically provides for detecting when the last document in the initial stack just recited has moved from the tray to the copying platen. To this end, the tray itself includes a through slot extending into its main body or base from one side of the latter (as distinguished from either its front or back end). The assembly also includes means located to one side of the feed tray adjacent the slot and therefore to one side of the looped path of movement of the original documents for movably supporting a sensing element on top of the stack when the latter is within the feed tray such that the sensing element initially moves downward with the stack as it becomes smaller. Thereafter, this element moves through the slot as the last document in the stack is fed from the tray, then along the same side of the tray and ultimately to a starting position above the same stack which has been returned to the feed tray whereby the feeding procedure can be repeated using the same stack or a new one. Finally, the sensing assembly includes means responsive to the position of the sensing element for indicating when the last document within the stack has left the tray for the copying platen.

From the foregoing, it should be apparent that both of the problems discussed above are overcome by the assembly disclosed herein. By positioning this assembly adjacent one side of the tray, specifically the side selected as a measuring side, the original documents can never be too short, either lengthwise or widthwise, for the assembly. Also, the assembly is not positioned within the path of movement of the documents as they are fed between the tray and platen but rather to one side thereof and therefore there is no need to take this path of movement into consideration when designing the sensing assembly or the document feed arrangement generally.

The overall stack sensing assembly disclosed herein will be described in more detail hereinafter in conjunction with the drawings wherein:

FIG. 1 is a perspective view of the stack sensing assembly shown in combination with an automatic document feed arrangement forming part of an electrophotographic copying apparatus of the general type described previously;

FIG. 2 is a top plan view of the assembly and feed arrangement illustrated in FIG. 1;

FIG. 3 is an exploded perspective view of the stack sensing arrangement in accordance with a specific, preferred embodiment of the present invention; and FIGS. 4A–4D diagrammatically illustrate the way in which the assembly illustrated in FIG. 3 operates.

Turning now to the drawings, wherein like components are designated by like reference numerals throughout the various figures, attention is first directed to FIG. 1 which illustrates an overall electrophotographic copying apparatus generally indicated by the reference numeral 10. While not shown, this apparatus includes the necessary components for making copies from original documents. These components include, for example, a rotatable drum having a photosensitive outer circumferential surface, means for forming an electrostatic image corresponding to the original being copied on the drum's photosensitive surface, means for developing the image formed using suitable toner, and means for transferring the applied toner from the drum to a blank sheet which ultimately becomes the final copy. The apparatus also includes other readily providable components which have not been mentioned including specifically a copying platen which supports an original as the latter is being copied. For a more detailed discussion of some of these components including a particular copying platen, reference is made to U.S. patent application Ser. No. 199,096 filed Oct. 20, 1980 now U.S. Pat. No. 4,384,784.

In addition to the components referred to above, and possibly some disclosed in the pending U.S. patent application just recited, overall copying apparatus 10 includes an automatic document feed arrangement which is generally indicated at 12. This arrangement includes a tray 14 which is physically located directly over the copying platen recited above. As illustrated in FIG. 1, this tray includes a horizontally extending lowermost base 16, side walls 18 and 20 extending vertically upward from opposite sides of base 16, and an end wall 22 extending vertically upward from what will be characterized as the front end of base 16. End wall 22 and the base 16 are designed to provide a passageway 24 therebetween for reasons to be discussed below.

As best illustrated in FIG. 1, tray 14 is designed to contain a stack of original documents 26. The side walls 20 and the end wall 22 serve as measuring edges for the original document. More specifically, when the stack of documents 26 are initially positioned within tray 14, the left hand edge of the stack (as viewed in FIG. 1) should be placed in abutting engagement with the side walls 20 and its front edge should be placed in a similar engagement with end wall 22. This ensures that the stack is properly positioned within the tray regardless of the size of the originals making up the stack.

Overall copying apparatus 10 is designed to make successive copies from a stack of original documents in an automated manner. To this end, feed arrangement 12 includes suitable and readily providable means in addition to tray 14 for acting on the stack of documents 26 in a way which successively moves each document onto the previously mentioned copying platen from the bottom of the stack and thereafter back onto the top of the stack within the tray after one or more copies have been made. This movement of the successive documents takes place along a looped path from the tray to the platen through opening 24 at the front end of tray 14, as indicated by arrow 28, and thereafter back onto the tray from the back end of the latter, as indicated by arrows 30. As stated immediately above, the means necessary to carry out this feeding procedure are readily providable. Because these means do not form part of the present invention per se they will not be described herein. It suffices to say that if a stack of original documents numbering, for example, 100 is placed in the appropriate position on tray 14, feed arrangement 12 will act on the stack for automatically feeding the documents in the manner described, one at a time, onto the copying platen (where one or more copies are made) and thereafter back into the tray in order to re-establish the stack.

Multiple copies of the originals in feed tray 14 can be made by feeding the stack through just one cycle in which case multiple copies of each document would be made at the time that document is initially placed onto the copying platen. On the other hand, multiple copies could also be made by continuously feeding the stack onto the copying platen through a plurality of cycles equal in number to the number of copies to be made, in which case each time a given original is placed on the platen only one copy is made. In either case, it is necessary to know when the last original document in the stack has been fed onto the copying platen from tray 14 in order to turn off the apparatus after the stack has moved through its last feed cycle, either after one time or after a preset number of times depending on which of the procedures just mentioned is used. To this end, the apparatus includes an end-of-feed sensor assembly 32 designed in accordance with the present invention for doing this.

Referring to FIG. 2 in conjunction with FIG. 1, assembly 32 is shown including a horizontally extending sensing pin 34 having a free forwardmost end section 34a and a back end which is supported to one end of a straight support arm 36. The other end of the support arm is connected to a series of components which will be described in more detail hereinafter in conjunction with FIG. 3. For the moment, these other components will be generally indicated at 38 in FIGS. 1 and 2. These components 38 first serve to support arm 36 for 360° rotation about a horizontal axis 39 whereby to cause the sensing pin to move about a vertically extending circular path while always remaining horizontal.

As best illustrated in FIG. 2, horizontal axis 39 is disposed at an acute angle with respect to side walls 20 and therefore with the abutting side of paper stack 26 when the latter is disposed within tray 14. As a result, the circular path defined by the forwardmost end 34a of pin 34 as the latter moves lies in a vertical plane which is also at an acute angle to the side edge 20 of tray 14, as indicated by dotted lines 40. At the same time, the sensing pin is positioned relative to tray 14 such that it falls within the confines of the latter as it moves through a portion of its circular path. More specifically, as the sensing pin moves vertically downward from the top of its path in the direction of arrow 42 (see FIG. 1), its forwardmost end 34a extends into the tray over side edge 20 until it engages the uppermost sheet in stack 26. End section 34a is caused to rest against the top of the stack and moves down with the latter as the lowermost sheets are fed to the copying platen by previously recited components 38. In the meantime, those originals which have been copied are returned to the tray over section 34a of the sensing pin. After the last original in the initial stack is fed from tray 14, the sensing pin is free to move further downward along its path and eventually returns to the top of the path. In order to allow end section 34a of the sensing pin to move through the base of the tray, the latter includes a cooperating slot 44 which is best illustrated in FIG. 2. Because of the skewed orientation of the sensing pin's path of movement relative to tray 14, this is the only modification required to the copying apparatus in order to ensure that the sensing pin moves freely about its path, of course, except for the stack itself.

Returning to FIG. 1, components 38 for controlling rotational movement of sensing pin 34 is operatively connected with feed arrangement 12 for ensuring that the sensing pin moves down with stack 26 and for automatically turning off the copying apparatus after all of the original documents have been copied. As will be seen below, these components include means for actually sensing when pin 34 has passed through slot 44 in order to tell when an entire stack of documents has been copied.

Referring to FIG. 3, attention is directed to the specific components making up sensing arrangement 32. These components include the previously described sensing pin 34 which is supported at one end of previously described arm 36. The other end of arm 36 is connected with a cam member 50 having a constant rise cam surface 60 and an end projection 62. The cam member is mounted for rotation on the output shaft of a direct current motor 64 which is powered through leads 66 from a suitable source not shown. In addition to these components, the overall arrangement 32 includes an electromagnetic solenoid 68 electrically energized and de-energized through leads 70 from a suitable source not shown and having an output plunger 72 which rotatably carries at its outermost end one end of a cam follower 74.

When the solenoid 68 is in an energized state, its plunger is pulled in (closer to the solenoid body) and so is the cam follower. When the solenoid is in its de-energized state, a return spring 76 disposed around the plunger between the solenoid body and cam follower ensures that the plunger extends all the way outward. Finally, overall arrangement 32 includes a switch 78 having an actuating button 80 exposed adjacent an actuating projection section 82 of cam follower 74, a tension spring 84 and a stop element 86 which is physically connected in the position illustrated by means not shown. As will be seen below, so long as the actuating button 80 is not actuated, no signal appears across the output leads 88 of switch 78. Once the button is actuated, a signal is provided across these ends (for example in the form of a closed electric circuit).

Having described the various components making up overall end-of-feed sensing assembly 32 from a structural standpoint, attention is now directed to the way in which it operates to sense when the last document in stack 26 (FIG. 1) has been fed from tray 14. To this end, let it first be assumed that a full stack is in the tray and that the sensing pin 34 is in an initial locked position sufficiently high above the tray to allow the stack to be placed therein. This is best illustrated in FIG. 4A. It is also illustrated in FIG. 3 wherein the cam's end projection 62 is shown engaged by a projection 90 at the free end of cam follower 74. This interlocking arrangement prevents the weight of sensing pin 34 and arm 36 from moving the sensing pin downward toward tray 14. Once a stack of originals 26 are placed into tray 14 and apparatus 10 is ready to feed the documents from the tray to the copying platen, a start signal is applied to the solenoid through lead 70 in order to energize it and pull in plunger 72. This causes the cam follower to be pulled in with it until projection 90 is free of all influence and/or constraints by cam 50. By action of tension spring 84, the cam follower will be raised until stopped by stop element 86. At that time, motor 64 is rotated an increment by means of a steady DC voltage or pulse on leads 68 in order to rotate the cam 58 counterclockwise (viewed in FIG. 3) sufficient to place projection 90 behind projection 62. At that time, the solenoid 68 is de-energized, causing the cam follower to be pushed forward by means of a return spring 76. However, the motor 64 is continuously energized until sensing pin 34 engages the top of stack 26, as best illustrated in FIG. 4B. At the same time, projection 90 will move into the rotative path of the cam at some point over its dwell portion 60a (see FIG. 4C) depending on the height of stack 26. Thereafter motor 64 will be intermittently energized by means of a series of pulses on leads 66 in synchronism with the feeding of the documents from stack 25 on tray 14 to the copying platen in order to cause sensing pin 34 to be positively driven downward with the stack.

In FIG. 4C, the sensing pin is shown directly above the last document to be fed from tray 14. At the same time, it should be noted that the remaining documents from the initial stack have been returned to the tray and lie on and directly above the sensing pin. The motor 64 is energized (pulsed) a predetermined interval after the trailing end of this last document is removed from under the sensing pin and, in fact, after each document has been fed before it. This pulse to the motor is also long enough so that the sensing pin is being forced down against the top sheet of the stack (in the case of the prior sheets) when the previously fed sheet arrives over the pin. This prevents the arriving sheet from inadvertently passing under the pin. The motor pulse length is the same for every cycle.

With the sensing pin in the position illustrated in FIG. 4C, the projection 90 at the free end of cam follower 74 is still clear of the cam dwell surface. The actuating element 82 on the cam follower remains out of engagement with the actuating button 80 of switch 78. After the last document in the initial stack has been fed from tray 14, motor 64 moves sensing pin 34 downward through slot 44 causing actuating element 82 to engage button 80 as illustrated in FIG. 4D. This, in turn, causes an appropriate signal to be placed on leads 88 which is used to indicate to the appropriate controls in the apparatus that the initial stack has been entirely fed from tray 14. Thereafter, the sensing pin is continuously rotated around its path until it reaches its interlocked FIG. 4A position.

It should be obvious from the foregoing that suitable and readily providable controls synchronizing operation of the feed assemby 12 and sensing arrangement 32 can be provided. The power sources for motor 64 and solenoid 68 would be part of these controls, as would the lead wires 88 forming part of switch 78.

What is claimed is:

1. In an electrophotographic apparatus designed to make successive copies from a stack of original documents, automatically, by using a feeding arrangement configured to act on the stack in a way which successively moves each document onto a copying platen from the bottom of the stack when the latter is placed in a feed tray forming part of the arrangement and thereafter back onto the top of the stack within the tray along a looped path of movement from the tray to the platen and back to the tray, an assembly for detecting when the last document in that stack has moved from the tray to the copying platen, said assembly comprising:
   (a) a through slot extending into said feed tray from one side of the latter;
   (b) means located to one side of the feed tray adjacent said slot and therefore to one side of the looped path of movement of said original documents for movably supporting a sensing element on the top of said stack when the latter is within said feed tray such that the sensing element initially moves downward with the stack as it becomes smaller, thereafter through said slot as the last document in the stack is fed from the tray and then along a path of movement first along said one side of the tray, and ultimately onto the same stack which has been returned to the feed tray or onto a newly provided stack, whereby the feeding procedure can be repeated; and (c) means responsive to the position of said sensing element for indicating when the last documents within the stack have left the tray.

2. An apparatus according to claim 1 wherein the path of movement of said sensing element extends at an acute angle with the looped path of movement of said original documents, whereby only said slot is necessary in said tray for allowing the sensing element to move unobstructed along its path of movement, except for the stack of documents within the tray.

3. An apparatus according to claim 1 wherein said supporting means includes a motor connected with said sensing element for moving the latter along its path when the motor is energized and means for energizing said motor, said energizing means being synchronized with said feeding arrangement to intermittently energize the motor after each of the original documents is fed from the tray for a predetermined period of time.

4. An apparatus according to claim 3 wherein said period of time is sufficient to cause said sensing element to bear down against the document to be fed next, if there is one, while the document leaving the copying platen at that approximate time enters said tray whereby to prevent this latter document from moving under said sensing element.

5. An apparatus according to claim 1 wherein said one side of said feed tray including said slot serves as a measuring side for the original documents, whereby said sensing element will engage the top of said stack when the latter is in said tray regardless of the length or width of the documents.

6. An apparatus according to claim 1 wherein supporting means include motor means connected with said sensing element for moving the latter along its path, means for locking said sensing element into a position above and spaced from said tray so that a stack of original documents can be placed thereon and means for unlocking said locking means.

7. An apparatus according to claim 6 wherein said indicating means includes a switch and a cam and cam follower mechanism interconnecting with said sensing element for engaging the switch when said element is at a predetermined position along its path for indicating when the last document on said tray has left the latter.

8. An apparatus according to claim 7 wherein said cam and cam follower mechanism also serve as said locking means and wherein said unlocking means include an electromagnetic relay means acting on said cam follower in order to move the latter in a predetermined way.

* * * * *

UNITED STATES PATENT AND TRADEMARK OFFICE
CERTIFICATE OF CORRECTION

PATENT NO.   :   4,451,138
DATED        :   May 29, 1984
INVENTOR(S)  :   Carl P. Anderson It is certified that error appears in the above—identified patent and that said Letters Patent is hereby corrected as shown below:

Front Page, paragraph [73] after "Assignee" delete "Ricoh Systems, Inc., San Jose, Calif." and insert therefore --Ricoh Company, LTD. Tokyo, Japan--.

Signed and Sealed this

Nineteenth Day of March 1985

[SEAL]

Attest:

DONALD J. QUIGG

Attesting Officer     Acting Commissioner of Patents and Trademarks